United States Patent
Wu

(10) Patent No.: US 11,805,123 B2
(45) Date of Patent: *Oct. 31, 2023

(54) REMOTE DESKTOP MONITORING USING A WEBCAM

(71) Applicant: CITRIX SYSTEMS, INC., Fort Lauderdale, FL (US)

(72) Inventor: Hao Wu, Nanjing (CN)

(*) Notice: Subject to any disclaimer, the term of this patent is extended or adjusted under 35 U.S.C. 154(b) by 350 days.

This patent is subject to a terminal disclaimer.

(21) Appl. No.: 17/179,558

(22) Filed: Feb. 19, 2021

(65) Prior Publication Data

US 2021/0176243 A1    Jun. 10, 2021

Related U.S. Application Data

(63) Continuation of application No. 16/032,419, filed on Jul. 11, 2018, now Pat. No. 10,938,807.

(51) Int. Cl.
*H04L 9/40* (2022.01)
*G06F 9/451* (2018.01)
*G06V 40/16* (2022.01)

(52) U.S. Cl.
CPC .......... *H04L 63/0861* (2013.01); *G06F 9/452* (2018.02); *G06V 40/172* (2022.01)

(58) Field of Classification Search
CPC .... H04L 63/0861; G06F 9/452; G06V 40/172
USPC .......................................................... 726/6
See application file for complete search history.

(56) References Cited

U.S. PATENT DOCUMENTS

| 9,176,744 | B2 | 11/2015 | Lee |
| 9,538,345 | B2 | 1/2017 | Sah et al. |
| 10,762,368 | B2 * | 9/2020 | Lin ...................... H04N 23/633 |
| 10,834,082 | B2 * | 11/2020 | Call ....................... H04L 63/10 |
| 2013/0167212 | A1 | 6/2013 | Azar et al. |
| 2015/0032436 | A1 | 1/2015 | van de Kamp |
| 2017/0054987 | A1 | 2/2017 | Rangarajan et al. |

OTHER PUBLICATIONS

Patil et al., 2nd IEEE International Conference on Computational Systems and Information Technology for Sustainable Solutions 2017, "IoT enabled Video Surveillance System using Raspberry Pi", pp. 308-314 (Year: 2017).*
Quick et al., "IoT Device Forensics and Data Reduction", 2018 IEEE, vol. 6, pp. 47566-47574 (Year: 2018).*
Kim et al."Cloud-based Virtual Desktop Service Using Lightweight Network Display Protocol", 2016 IEEE, ICOI N 2016, pp. 244-248 (Year: 2016) ** SEE U.S. Appl. No. 16/032,419.

* cited by examiner

Primary Examiner — Khalil Naghdali

(57) ABSTRACT

A computing device includes a memory and a processor to provide a web application to be accessed by a client device, receive from a camera images of a person at the client device, and analyze the images to determine that security of the web application is being compromised by the person based on the images. The processor provides at least one action to be taken by the client device in response to analysis of the images. The at least one action is to modify access of the client device to the web application.

18 Claims, 5 Drawing Sheets

REMOTE DESKTOP MONITORING USING A WEBCAM

RELATED APPLICATIONS

This application is a continuation of U.S. application Ser. No. 16/032,419 filed Jul. 11, 2018, which is hereby incorporated herein in its entirety by reference.

TECHNICAL FIELD

The present disclosure relates to virtual sessions, and more particularly, to enhancing user experience and security of a virtual session using a webcam.

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users.

In desktop virtualization, a user's computing environment (e.g., operating system, applications, and/or user settings) may be separated from the user's physical computing device (e.g., smartphone, laptop, desktop computer). Using client-server technology, a "virtualized desktop" may be stored in and administered by a remote server, rather than in the local storage of the client computing device.

There are several different types of desktop virtualization systems. As an example, Virtual Desktop Infrastructure (VDI) refers to the process of running a user desktop inside a virtual machine that resides on a server. VDI and other server-based desktop virtualization systems may provide personalized desktops for each user, while allowing for centralized management and security. Servers in such systems may include storage for virtual desktop images and system configuration information, as well as software components to provide the virtual desktops and allow users to interconnect to them. For example, a VDI server may include one or more hypervisors (virtual machine managers) to create and maintain multiple virtual machines, software to manage the hypervisor(s), a connection broker, and software to provision and manage the virtual desktops.

SUMMARY

A computing device includes a memory and a processor to provide a web application to be accessed by a client device, receive from a camera images of a person at the client device, and analyze the images to determine that security of the web application is being compromised by the person based on the images. The processor provides at least one action to be taken by the client device in response to analysis of the images. The at least one action is to modify access of the client device to the web application.

The computing device advantageously improves security of a virtual session by analyzing the images of the user operating the client device. This may prevent an unwanted user from logging in with someone else's credentials, as well as detecting when a user is using an external camera to record the virtual session. If such actions were detected, then the login to the virtual session would be denied or the virtual session would be closed. In addition, the computing device may periodically monitor the camera to more accurately determine productivity of a user, and to close the virtual session when detecting the user is no longer using the virtual session.

Analyzing the images may include determining presence of the person, with the at least one action to be taken based on the determined presence of the person.

Analyzing the images may include determining an identity of the person's face, with the at least one action to be taken based on the determined identity of the person's face.

Analyzing the images may further include determining that the identity of the person's face matches a log-in account, with the at least one action to be taken being further based on the determined identity of the person's face matching the log-in account.

Analyzing the images may include determining that the person is taking a picture of the web application being accessed, with the at least one action to be taken based on determining that the person is taking the picture.

The at least one action to be taken may include allowing the person to access the web application, preventing the person from accessing the web application, generating a report based on the analyzed images, and/or recording how long the person is viewing the web application being accessed.

The images may be periodically received by the processor.

Another aspect is directed to a method for operating the computing device as described above. The method includes providing a web application to be accessed by a client device, receiving from a camera images of a person at the client device, and analyzing the images to determine that security of the web application is being compromised by the person based on the images. The method further includes providing at least one action to be taken by the client device in response to analysis of the images, with the at least one action to modify access of the client device to the web application.

Yet another aspect is directed to a computing device that includes a memory and a processor to provide a web application to be accessed by a client device, and receive from a camera images of a person at the client device. The images are analyzed by the processor to determine that the person is recording at least one image of the web application being accessed. The processor then provides at least one action to be taken by the client device in response to the person recording the at least one image of the web application being accessed. The at least one action includes changing access of the client device to the web application.

DETAILED DESCRIPTION

The present description is made with reference to the accompanying drawings, in which exemplary embodiments are shown. However, many different embodiments may be used, and thus the description should not be construed as limited to the particular embodiments set forth herein. Rather, these embodiments are provided so that this disclosure will be thorough and complete. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
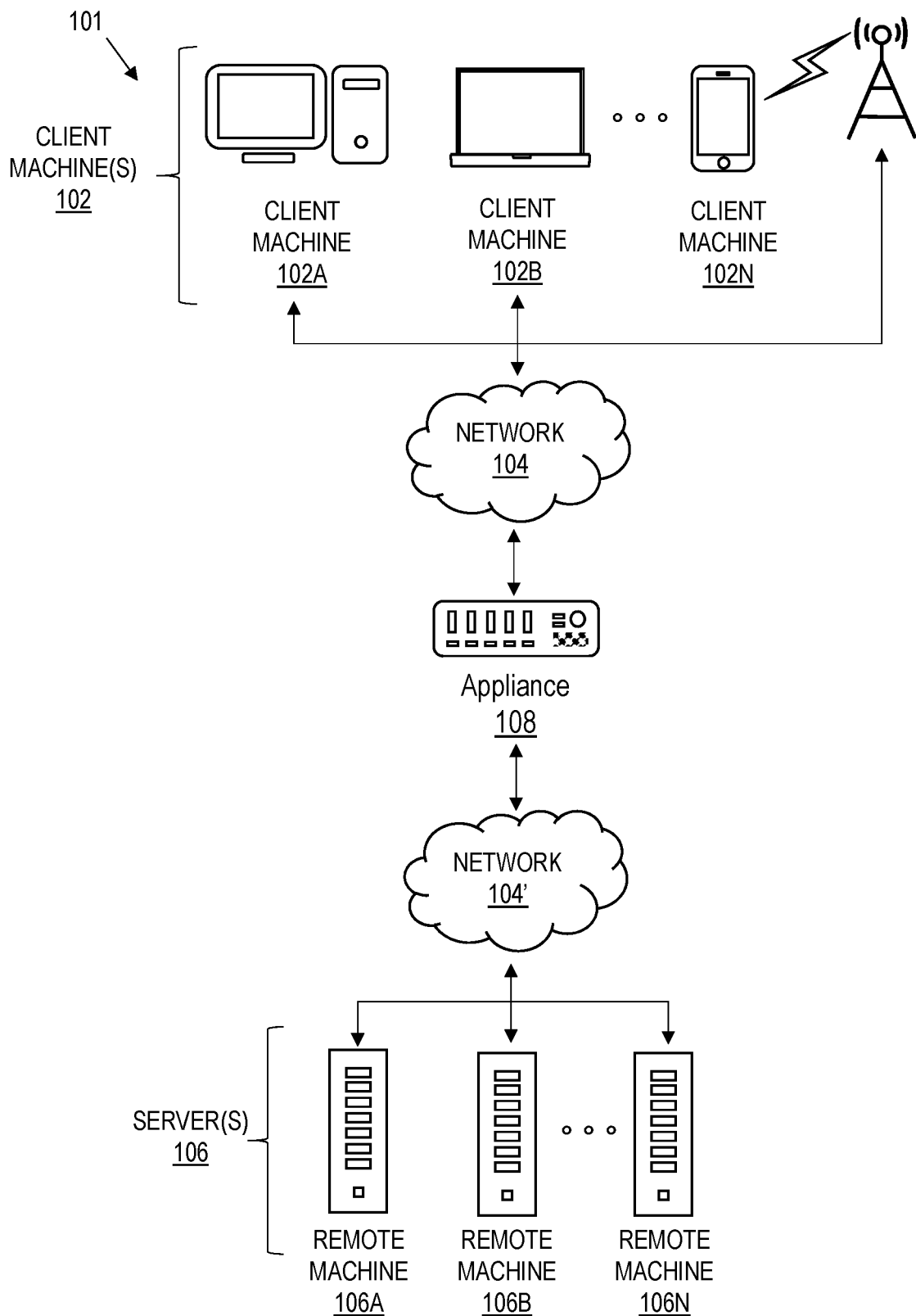
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation client or other client or program that uses a thin-client or a remote-display protocol to capture display output generated by an application executing on a server 106 and transmits the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a WLAN, the protocols may include 802.11, Bluetooth, and Near Field Communication (NFC).

Figure 2:
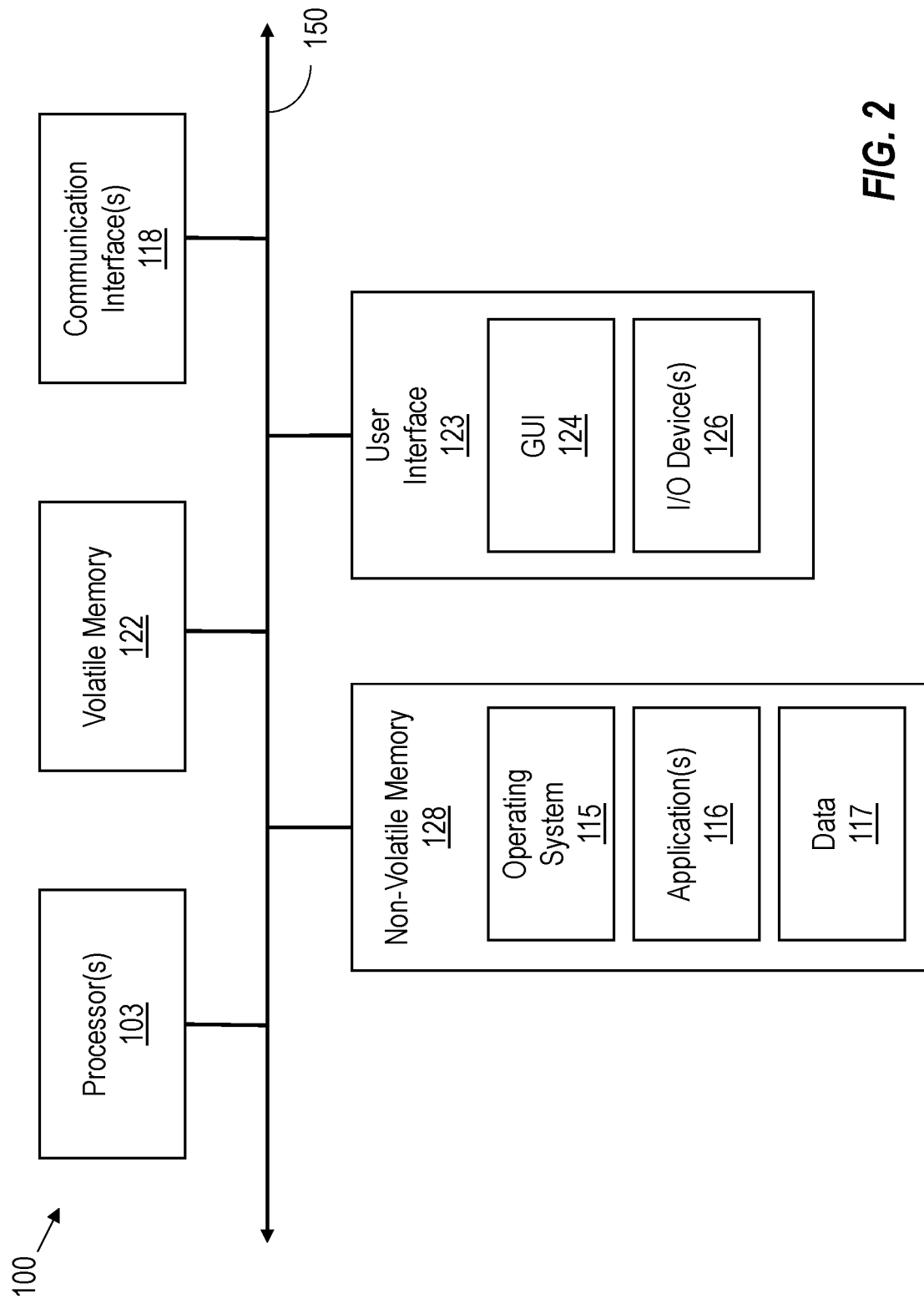
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102 or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid state storage media; one or more hybrid magnetic and solid state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s) 103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor may be analog, digital or mixed-signal. In some embodiments, the processor may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
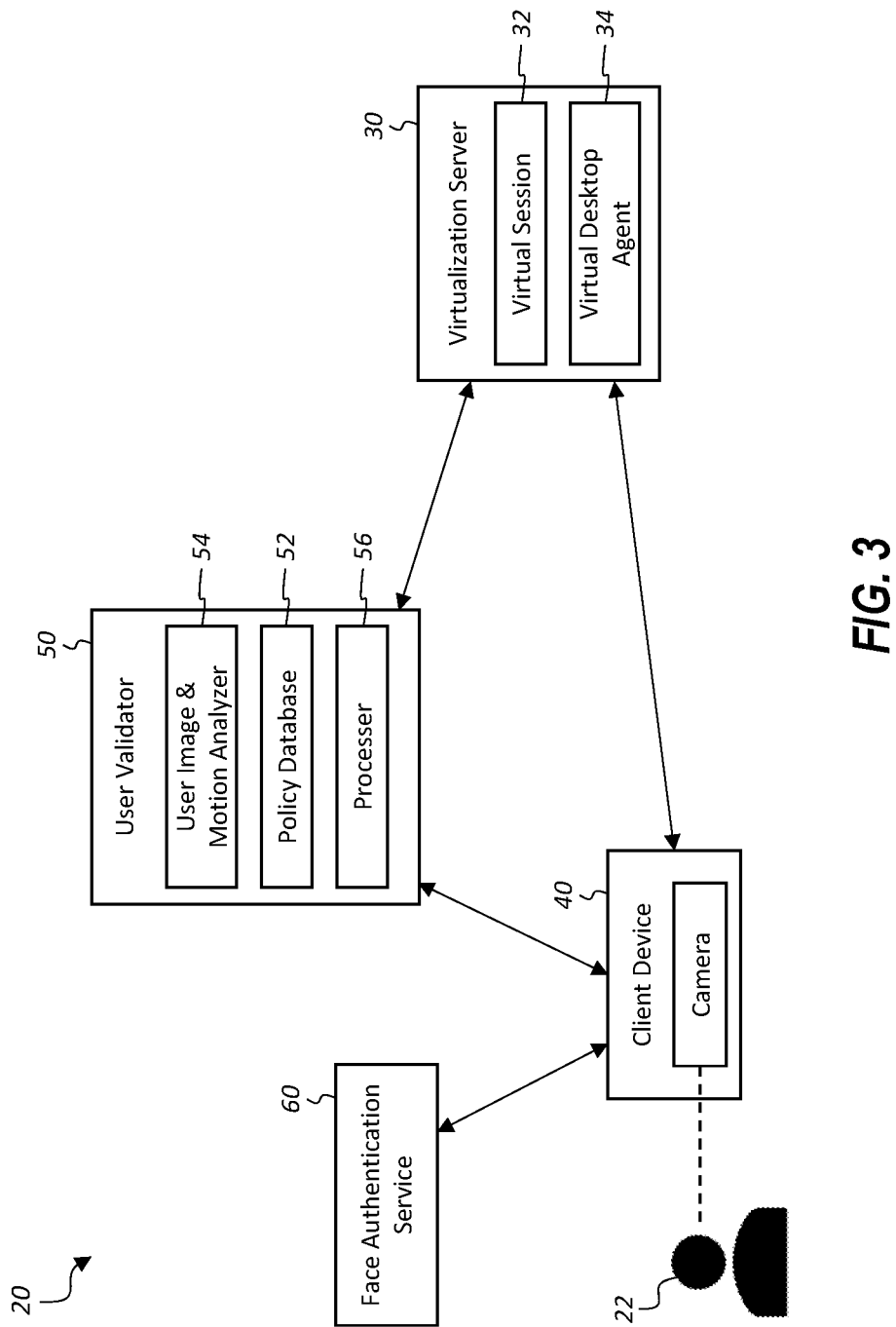
FIG. 3 is a block diagram of a computing system with remote desktop monitoring using a webcam in which various aspects of the disclosure may be implemented.

Referring initially to FIG. 3, a computing system 20 with remote desktop monitoring using a webcam 22 will be discussed. As will be explained in detail below, a mechanism is provided to enhance remote desktop user experience and security based on a user's authentication and motion in front of the webcam 42 on the client device 40 side. Various actions may be taken by the computing system 20 based on analyzing the user's authentication status and motion in front of the webcam 42.

Virtual display infrastructure (VDI) may be subject to data security issues. For example, data security may be compromised when a user logging into a virtual session uses another user's login credentials. This may result in an unwanted user logging into other accounts within the virtual display infrastructure. As another example, data security may be compromised when a user of the virtual session records the virtual session being displayed. This may lead to sensitive data being compromised.

Also, there is no effective way to precisely measure the working hours of a user who is working with a virtual session. Measuring the time between login and logoff of the user may lead to inaccurate results since the user can open the virtual session while doing other things.

The computing system 20 includes a virtualization server 30 configured to provide a virtual session 32, and a client device 40 configured to communicate with the virtualization server 30 and display the virtual session 32. The virtual session 32 may be managed by virtual desktop agent (VDA) 34 or hypervisor, for example.

The client device 40 includes a camera 42 for generating user images of a user 22 of the client device 40. The camera 42 may also be referred to as a webcam. The user images include the face of the user 22 along with an authentication status, and motion of the user 22 in front of the camera 42.

A user validator 50 includes a policy database 52 for security enforcement, and is configured to analyze the user images, and select at least one policy from the policy database 52 based on the analyzed images. The at least one policy provides at least one action to be taken by the computing system 20 to protect the virtual session.

The user validator 50 advantageously improves security of a virtual session 32 by analyzing the images of the user 22 operating the client device 40. This may prevent an unwanted user from logging in with someone else's credentials, as well as detecting when a user is using an external camera to record the virtual session. If such actions were detected by the user validator 50, then the login to the virtual session 32 would be denied or the virtual session 32 would be closed. In addition, the user validator 50 may periodically monitor the camera 42 to more accurately determine productivity of a user 22, and to close the virtual session 32 when detecting the user 22 is no longer using the virtual session 32.

The user validator 50 is illustrated as being separate from the client device 40 and the virtualization server 30. Alternatively, the user validator 50 may be included within the client device 40 or the virtualization server 30.

In addition to the user validator 50 including the policy database 52, the user validator 50 further includes a user image and motion analyzer 54 to analyze the user images from the camera 42, and a recorder 56 to record when the user 22 is compromising the security of the virtual session 32.

The camera 42 provides images of the user's face to the user validator 50 when the user 22 logs into the virtual session 32. At the start of the user 22 logging in, the client device 40 provides the images of the user's face to a face authentication service 60 for authentication.

The face authentication service 60 is shown as being remotely accessed by the client device 40. The face authentication service 60 may be Active Directory, for example. Alternatively, the face authentication service 60 may be local to the client device 40.

Authentication status of the user 22 is provided to the client device 40, which in turn provides the authentication status to the user validator 50. The user validator 50 progresses through the steps of determining if the user's face can be identified and if the user's face matches a login account based on the authentication status provided by the authentication service 60.

If the user's face cannot be identified or if the user's face does not match the login account, then the at least one action to be taken by the computing system 20 includes denying the user's login attempt. The user validator 50 may instruct the client device 40 and/or the virtualization server 30 to deny user login. Another action that may also be taken is to report to an administrator of the failed login attempt.

The camera 42 periodically provides images of the user 22 to the user validator 50 after the user 22 logs into the virtual session 32. The user validator 50 analyzes the periodic images of the user 22 so as to determine if the user 22 is compromising the security of the virtual session 32. Compromising the security of the virtual session 32 includes, for example, the user 22 taking a picture of the virtual session 32 being displayed.

If the user validator 50 determines that the user is compromising the security of the virtual session 32, then the at least one action to be taken comprises closing the virtual session 32. The user validator 50 may also record and report when the user is compromising the security of the virtual session 32. The improper action may be recorded by the recorder 56 within the user validator 50.

The user validator 50 may also analyze the periodic images of the user 22 so as to determine productivity of the user 22 operating the virtual session 32 within a determined time interval. Productivity is based on frequency of the periodic images being provided by the camera 42 and the number of times the user is working corresponding to the total number of times that the user could be working during the determined time interval. For example, the camera 42 periodically scans 3 minutes at a time. The user may have 100 times to be considered as working in a day. The total working time in a day equals 3*100=300 minutes which is 5 hours.

The user validator 50 may also analyze the periodic images so as to determine if the user 22 is no longer operating the virtual session 32, and to close the virtual session 32 if the user 22 is no longer operating the virtual session 32. The client device 40 may query the virtual server 30 to determine user input activity, with this information being provided to the user validator 50 to assist with determining if the user 22 is no longer operating the virtual session 32. Closing the virtual session 32 when not in use conserves computing system 20 resources, as well as saving power.

When the client device 40 is not in use, it may be placed in a sleep mode. The images from the camera 42 are still analyzed by the user image and motion analyzer 54. If the user image and motion analyzer 54 detects that the user 22 has retuned and is in front of the camera 42, then the client device 40 wakes up from its sleep mode.

Figure 4:
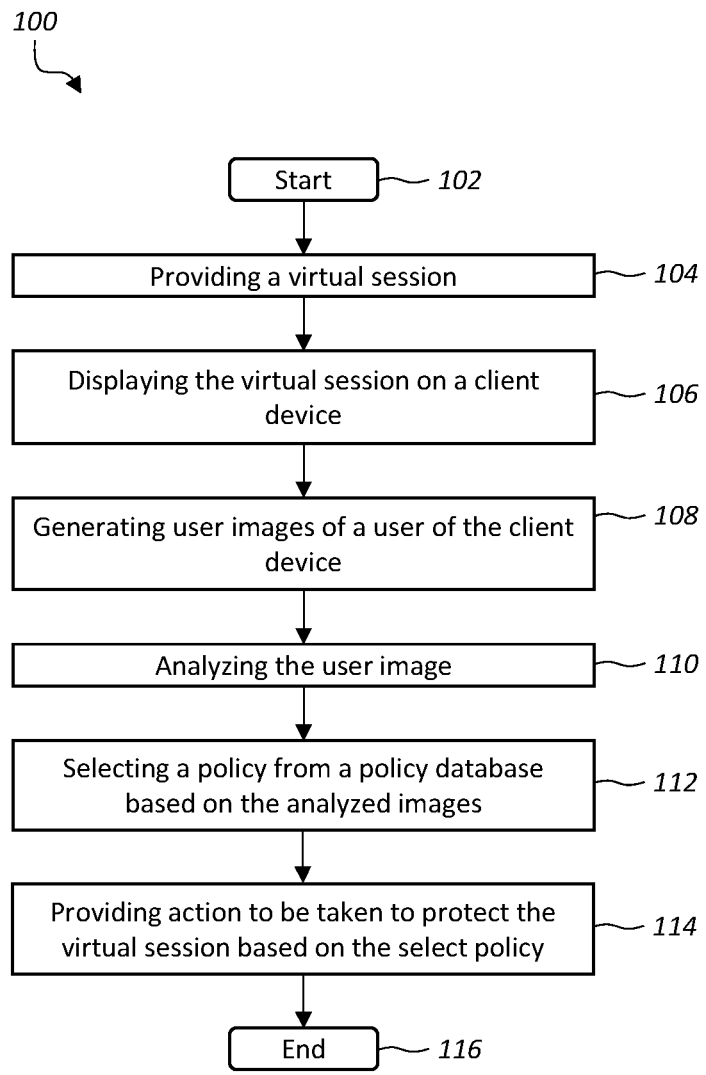
FIG. 4 is a general flowchart illustrating a method for operating the computing system illustrated in FIG. 3.

Generally speaking for the flowchart 100 in FIG. 4, a method for operating the computing system 20 includes from the start (Block 102), operating the virtualization server 30 to provide a virtual session 32 at Block 104. The client device 40 communicates with the virtualization server 30 and displays the virtual session 32 at Block 106.

The camera 42 is operated at Block 108 to generate user images of the user 22 of the client device 40. The method further includes operating the user validator 50 to analyze the user images at Block 110, and selecting at least one policy from the policy database 52 based on the analyzed images at Block 112, and providing action to be taken to protect the virtual session 32 based on the selected policy at Block 114.

Actions to be taken by the computing system 20 based on the analyzed user images include, for example, allowing or denying user login to the virtual session 32, and allowing or closing the virtual session 32 after the user logs in. The method ends at Block 116.

Figure 5:
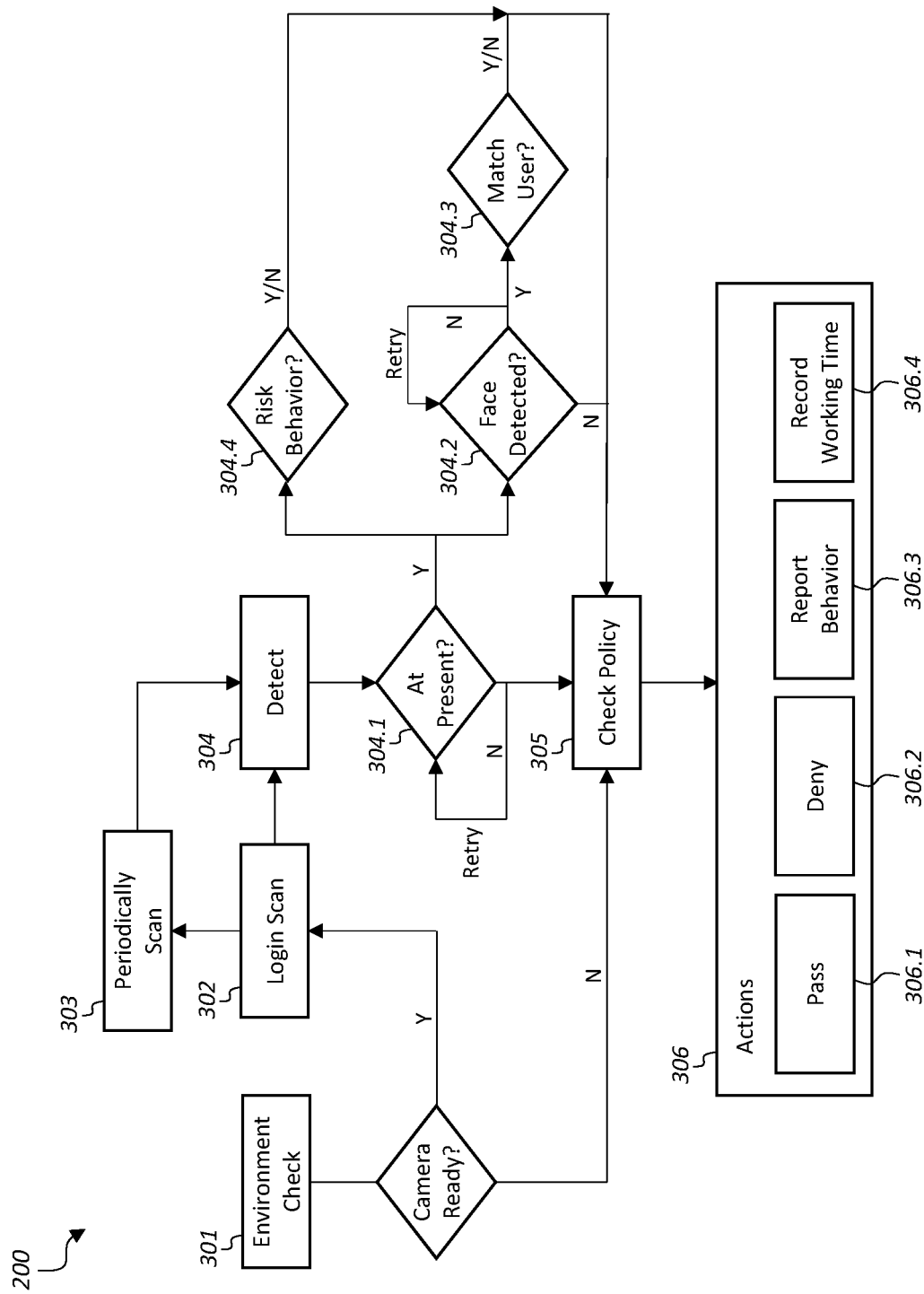
FIG. 5 is a more detailed flowchart illustrating a method for operating the computing system illustrated in FIG. 3.

Referring now to the flowchart 200 in FIG. 5, more detailed steps for operating the computing system 20 will be discussed. The steps are divided into a preparation stage, and an implementation stage. The flowchart 200 corresponds to the implementation stage.

In the preparation stage, data is prepared and policy for implementation is defined. A login account is defined or setup for the user 22. This includes recording the user's face as well as the necessary credentials for the user to login. This information is used by the face authentication service 60.

The policy for security enforcement is also defined. The different scenarios that may be analyzed by the user validator 50 are provided in TABLE 1. Scenario 202.1 is directed to a camera 42 not being installed or the camera is removed during the virtual session 32. Scenario 202.2 is directed to the identity of the user's face not matching the face corresponding to the user's account. Scenario 202.3 is directed to when a user 22 takes a risk action, such as using a camera to take a photograph of the virtual session 32. Scenario 202.4 is directed to when a user 22 cannot be detected after X number of tries.

Scenario 202.5 is directed when a user 22 can be detected and the identity of the user's face matches the face corresponding to the user's account. Scenario 202.5 is directed when a user can be detected and no risk action can be observed, but the face identity cannot be obtained after Y number of tries.

TABLE 1

| Scenario |
| --- |
| 202.1 Webcam not installed or is removed during operation |
| 202.2 When a user account does not match detected face identity |
| 202.3 When a user takes a risk action (e.g., take a picture of the virtual session) |
| 202.4 When a user cannot be detected after X number of tries |
| 202.5 When a user is detected and the user's account matches the detected face identity |
| 202.6 When a user can be detected and no risk action can be observed, but the face identity cannot be obtained after Y number of tries |

The implementation stage will now be discussed in reference to the flowchart 200. Step 301 is an environment check. The user 22 will check if the camera 42 is installed on the client device 40 by scanning for the camera's installed hardware and attempting to open the camera 42. If there is no camera 42 or if the camera 42 cannot be opened, then the procedure goes to Step 305 which includes the scenarios identified in TABLE 1.

If the camera 42 is installed and ready, then Step 302 is performed, which is the login scan step. Results of the login scan step are provided to Step 304, which is the detect step. The login scan is launched when the user 22 attempts to login to the virtual session 32 from the client device 40. After the user 22 enters their login credentials, the user 22 may then request face authentication. Alternatively, face authentication is automatically triggered if the user's login credentials are accepted. The result of the user's login credentials being accepted are passed to the user validator 50.

Images from the camera 42 are provided to the face authentication service 60. The face identity results are then received by the client device 40 which are passed to Step 304. Step 304 corresponds to the detection phase which is performed by the user validator 50.

Step 303 is performed between Step 302 and Step 304, which is the periodically scan step. Results of the periodically scan step are provided to Step 304, which is the detect step. After the user 22 logs into the virtual session 32, the camera 42 periodically scans the status of the user's mage as well as the user's motion. The user validator 50 will check if the virtual session 32 has been launched and that the user 22 is actively in front of the client device 40.

The information may be obtained by the client device 40 querying the virtual session 32. A determination can be made on whether the login account is for the current user, and whether the current user is operating the virtual session 32 based on monitoring mouse and keyboard inputs. Constant mouse movement or keyboard entries are important factors to check if the user 22 is operating the virtual session 32. This information is provided to the user validator 50 by the virtualization server 30 or by the client device 40, or both.

Now at Step 304 the detection phase is performed by the user validator 50. Based on inputs from Steps 302 and 303, the user validator 50 will detect the following areas as provided in TABLE 2.

TABLE 2

| Step | Description |
| --- | --- |
| 304.1 | If a user is in front of the webcam |
| 304.2 | If a user's face can be identified |
| 304.3 | If a user detected from the webcam matches the login account |
| 304.4 | If a user took risk behaviors (e.g., use camera to take photo on screen) |

Step 304.1 corresponds to if a user 22 is in front of the camera 42. If a user 22 cannot be detected after X number of tries, the procedure will go to Step 305 check policy. This step verifies if the camera 42 can detect the presence of a user 22, but does not check the identity of the user 22. If the user 22 can be detected, then Steps 304.2, 304.3 and 304.4 are to be performed.

Step 304.2 corresponds to if the user's face can be identified. If the user's face cannot be identified, the procedure will loop X number of tries. If the user's face cannot be identified after X number of tries, then the procedure will go to Step 305 check policy. If the user's face can be identified, then the procedure will go to Step 304.3.

Step 304.3 corresponds to if the user's face as detected by the camera 42 matches the user's login account. If the user 22 detected by the camera 42 does not match the login account, then the procedure will go to Step 305 check policy. Alternatively, if the user 22 detected by the camera 42 does match the login account, then the procedure will also go to Step 305 check policy.

Step 304.4 corresponds to if a user took risk behaviors. An example risk behavior is when the user 22 uses a camera to take a photograph or video of the virtual session 32 being displayed. If a risk behavior is detected by the camera 42, the procedure will go to Step 305 check policy. Alternatively, if a risk behavior is not detected by the camera 42, the procedure will go to Step 305 check policy. This step does not require the identity of the user's face.

Step 305 check policy is performed by the user validator 50. The user validator 50 looks to the policy database 52 for how to respond to the different scenarios as provided in TABLE 3. Depending on each respective scenario, the user validator 50 will recommend one or more possible actions to be taken. The one or more actions to be taken may be performed by the virtualization server 30 or by the client device 40.

TABLE 3

| Scenario | Possible actions |
| --- | --- |
| Webcam not installed or is removed during operation | 306.1 Pass<br>306.2 Deny |
| When a user account does not match detected face identity | 306.1 Pass<br>306.2 Deny<br>306.3 Report behavior |
| When a user takes a risk action (e.g., take a picture of the virtual session) | 306.1 Pass<br>306.2 Deny<br>306.3 Report behavior |
| When a user cannot be detected after X number of tries | 306.1 Pass<br>306.2 Deny |
| When a user is detected and the user's account matches the detected face identity, and the virtual session is active | 306.1 Pass<br>306.4 Record working hour |
| When a user can be detected and no risk action can be observed, but the face identity cannot be obtained after Y number of tries | 306.1 Pass<br>306.2 Deny |

The possible actions to be recommended by the user validator 50 include 306.1 pass and 306.2 deny. With a 306.1 pass, the user 22 can continue behavior without any interruption. With a 306.2 deny, the user will not be able to login or the virtual session 32 will be closed. The 306.1 pass and 306.2 deny are mutually exclusive meaning they cannot occur at the same time.

Another possible action to be taken by the user validator 50 includes reporting behavior of the user 22. The user validator 50 will record behaviors identified in Step 304, and then log the event. The log for the recorded event will include what is the behavior, when the behavior happens, and any supportive material. The supportive material is the recording of the user's behavior.

Another possible action to be taken by the user validator 50 includes 306.4 record working hour. The user validator 50 may consider if the user 22 is working at the virtual session 32, and then record current time as a working time slot. Based on the number of recorded time slots, an administrator can calculate the actual working time of the user by below formula. For example, the camera 42 periodically scans 3 minutes at a time. The user may have 100 times to be considered as working in a day. The total working time in a day equals 3*100=300 minutes which is 5 hours.

Another aspect is directed to a non-transitory computer readable medium for operating a user validator 50 that is part of a computing system 20 comprising a virtualization server 30 providing a virtual session 32 and a client device 40 communicating with the virtualization server 30 to display the virtual session 32. The client device 40 comprises a camera 42 for generating user images of a user 22 of the client device 40. The non-transitory computer readable medium has a plurality of computer executable instructions for causing the user validator 50 to perform steps comprising storing a policy database 52 for security enforcement, analyzing the user images, and selecting at least one policy from the policy database 52 based on the analyzed images. The at least one policy provides at least one action to be taken by the computing system 20 to protect the virtual session 32.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

The invention claimed is:

1. A computing device comprising:
a memory and a processor to:
provide a web application to be accessed by a client device,
receive from a camera images of a person at the client device,
analyze the images to determine that security of the web application is being compromised by the person based on the images, and
provide at least one action to be taken by the client device in response to analysis of the images, the at least one action to modify access of the client device to the web application,
wherein analyzing the images comprises determining that the person is taking a picture of the web application being accessed, with the at least one action to be taken based on determining that the person is taking the picture.

2. The computing device according to claim 1 wherein analyzing the images comprises determining presence of the person, with the at least one action to be taken based on the determined presence of the person.

3. The computing device according to claim 1 wherein analyzing the images comprises determining an identity of the person's face, with the at least one action to be taken based on the determined identity of the person's face.

4. The computing device according to claim 3 wherein analyzing the images further comprises determining that the identity of the person's face matches a log-in account, with the at least one action to be taken being further based on the determined identity of the person's face matching the log-in account.

5. The computing device according to claim 1 wherein the at least one action to be taken includes allowing the person to access the web application.

6. The computing device according to claim 1 wherein the at least one action to be taken includes preventing the person from accessing the web application.

7. The computing device according to claim 1 wherein the at least one action to be taken includes generating a report based on the analyzed images.

8. The computing device according to claim 1 wherein the at least one action to be taken includes recording how long the person is viewing the web application being accessed.

9. The computing device according to claim 1 wherein the images are periodically received by said processor.

10. A method comprising:
providing a web application to be accessed by a client device;
receiving from a camera images of a person at the client device;
analyzing the images to determine that security of the web application is being compromised by the person based on the images; and
providing at least one action to be taken by the client device in response to analysis of the images, the at least one action to modify access of the client device to the web application,
wherein analyzing the images comprises determining that the person is taking a picture of the web application being accessed, with the at least one action to be taken based on determining that the person is taking the picture.

11. The method according to claim 10 wherein analyzing the images comprises determining presence of the person, with the at least one action to be taken based on the determined presence of the person.

12. The method according to claim 10 wherein analyzing the images comprises determining an identity of the person's face, with the at least one action to be taken based on the determined identity of the person's face.

13. The method according to claim 12 wherein analyzing the images further comprises determining that the identity of the person's face matches a log-in account, with the at least one action to be taken being further based on the determined identity of the person's face matching the log-in account.

14. The method according to claim 10 wherein the at least one action to be taken includes at least one of the following:
allowing the person to access the web application; preventing the person from accessing the web application;
generating a report based on the analyzed images; and
recording how long the person is viewing the web application being accessed.

15. The method according to claim 10 wherein the images are periodically received.

16. A non-volatile computer-readable storage medium having computer readable program code embodied thereon, the program code configured to cause a processor to:
provide a web application to be accessed by a client device,
receive from a camera images of a person at the client device,
analyze the images to determine that the person is recording at least one image of the web application being accessed, and
provide at least one action to be taken by the client device in response to the person recording the at least one image of the web application being accessed, the at least one action to change access of the client device to the web application,
wherein analyzing the images comprises determining that the person is taking a picture of the web application being accessed, with the at least one action to be taken based on determining that the person is taking the picture.

17. The non-volatile computer readable storage medium according to claim 16 wherein the at least one action to be taken includes preventing the person from accessing the web application.

18. The non-volatile computer readable storage medium according to claim 16 wherein the at least one action to be taken includes generating a report.

* * * * *